United States Patent [19]
Jabs

[11] Patent Number: 5,715,394
[45] Date of Patent: Feb. 3, 1998

[54] METHOD OF SUPPORTING THE MANAGEMENT OF A COMMUNICATIONS NETWORK, AND NETWORK MANAGEMENT FACILITY THEREFOR

[75] Inventor: Arno Jabs, Ludwigsburg, Germany

[73] Assignee: Alcatel N.V., Amsterdam, Netherlands

[21] Appl. No.: 717,138

[22] Filed: Sep. 20, 1996

Related U.S. Application Data

[63] Continuation of Ser. No. 267,974, Jun. 29, 1994, abandoned.

[30] Foreign Application Priority Data

Jun. 29, 1993 [DE] Germany .................. 43 21 458.8

[51] Int. Cl.⁶ .................................................. G06F 13/00
[52] U.S. Cl. ....................... 395/200.11; 395/182.02; 395/200.1; 370/401
[58] Field of Search ........................... 395/200, 425, 395/182.02, 578, 200.01–200.09, 200.1, 200.11–200.19, 200.2; 370/825, 372, 400, 401, 402; 379/113

[56] References Cited

U.S. PATENT DOCUMENTS

| | | | |
|---|---|---|---|
| 4,644,532 | 2/1987 | Georage | 370/94 |
| 4,887,260 | 12/1989 | Carden et al. | 370/60 |
| 5,023,780 | 6/1991 | Brearley | 370/372 |
| 5,027,343 | 6/1991 | Chan et al. | 370/17 |
| 5,109,486 | 4/1992 | Seymour | 395/200 |
| 5,166,931 | 11/1992 | Riddle | 370/94.1 |
| 5,212,691 | 5/1993 | Hokari | 370/110.1 |
| 5,220,657 | 6/1993 | Bly et al. | 395/425 |

(List continued on next page.)

OTHER PUBLICATIONS

"DCA ADN Northern Telecom Present Demonstration Dallas", May 2, 1989. PRNewswire.

"Digital Communications Associates, Northern Telecom Announcement Alpharetta", Ga. Jan. 30, 1989, PRN ewswire.

"DCA ADN Northern Telecom Present Demonstration of Interoperability Between Wide Area Network Management Systems Dallas", May 2, 1989, PRNewswire.

"HP OpenView Network Management Server", Technical Data from Hewlett Packard product description, order No. 5952-1412, published in 1989.

*Primary Examiner*—Christopher B. Shin
*Attorney, Agent, or Firm*—Ware, Fressola, Van Der Sluys & Adolphson LLP

[57] ABSTRACT

A method of supporting the management of a communications network in a communications environment in which two or more communications networks are linked in such a way that an exchange of data is possible between them, and in which each communications network is managed by means of an associated, autonomous network management facility, wherein the network management facilities send each other, through a data network, data on the status of the communications networks managed by them, and that the data are made available to the respective network operator by the network management facility. A network management facility for managing such a communications network consisting of two or more network components, comprising an operating facility for communicating with the network operator which is equipped with at least one input device and at least one output device, and a control facility which is designed to manage all network components independently and which is provided with a first communications facility for exchanging management data with the network components, wherein the control facility is provided with a second communications facility for exchanging data with another network management facility, and that the control facility is designed to receive status information on at least one other communications network by means of the second communications facility and to condition the status information such that the operating facility can make the information accessible to the network operator.

11 Claims, 3 Drawing Sheets

U.S. PATENT DOCUMENTS

| | | | |
|---|---|---|---|
| 5,226,120 | 7/1993 | Brown et al. | 395/200.11 |
| 5,295,183 | 3/1994 | Langlois | 379/113 |
| 5,310,349 | 5/1994 | Daniels et al. | 395/152 |
| 5,333,308 | 7/1994 | Ananthanpillai | 395/575 |
| 5,426,421 | 6/1995 | Gray | 340/825.15 |
| 5,432,907 | 7/1995 | Picazo, Jr. et al. | 395/200 |
| 5,473,608 | 12/1995 | Gagne et al. | 370/85.13 |
| 5,559,955 | 9/1996 | Dev et al. | 395/182.02 |

METHOD OF SUPPORTING THE MANAGEMENT OF A COMMUNICATIONS NETWORK, AND NETWORK MANAGEMENT FACILITY THEREFOR

This application is a continuation of application Ser. No. 08/267,974 filed on Jun. 29, 1994; now abandoned.

TECHNICAL FIELD

The invention concerns a method of supporting a communications management and a network management facility therefor.

BACKGROUND OF THE INVENTION

The network management's task consists in managing a communications network. The scope of the task comprises, for instance, the installation and modification of the network's topology (configuration management), the recognition, treatment and correction of errors (error management), traffic monitoring and traffic measurements (traffic capacity management), and recording fees (fees management). A network operator fulfills this task through a network management installation, which can consist of several hierarchically organized and aligned partial network management installations, which support the network operator for a particular network management task.

The network management installation provides the network operator with control, checking and coordination functions and enables him (or her) to access all network components from a central station and to receive all the relevant data from there through his communications network. Such a network management installation is also called autonomous, since it is not one of several partial network management installations of a network operator. The concept of an autonomous, communications network can also be understood in this connection. It concerns the total of all partial communications networks that can be managed by a network operator.

The Hewlett-Packard product description 'HP Open View Network Management Server', which can be ordered as number 5952-1412 and appeared in 1989, describes such a generic network management installation. This installation enables the network operator to centrally manage an integrated speech and data network. The network components of different communications planes, such as the multiplexers of a transmission network and the coupling elements (e.g. routers) of a superimposed data network, can also be components of this communications network, as well as the network components from different manufacturers, which support different management protocols (e.g. the industrial standards CMCT or SNMP for TCP/IP networks).

In such network management installations, all of these different network components are managed on a common graphical user interface. This interface accesses a management program, which performs the actual controlling and checking tasks.

With this network management installation it is possible for a network operator in a central station to receive the status information of his entire communications network, and to access all of his network components. In this way, for instance, he is made aware of errors occurring in network components, the breakdown of network components, or the start of overload situations. He is then able to react to these situations e.g. by switching to alternative paths or reconfigure the communications network.

However, if for instance, data packages are sent to other communications networks of the network operator, which are coupled to the communications network, or connections are established through such communications networks, the network operator is often unable to keep up with his network management tasks. He therefore recognizes, for instance, that such a connection cannot be established, but no alternative path can be switched to, because he does not know the configuration of the foreign communications network.

SUMMARY OF THE INVENTION

The invention has the task of supporting the network management for communications relationships that go beyond the range of the autonomous communications network.

The task is fulfilled by a method of supporting the management of a communications network in a communications environment in which two or more communications networks are linked in such a way that an exchange of data is possible between them, and in which each communications network is managed by means of an associated, autonomous network management facility, characterized in that the network management facilities send each other, through a data network, data on the status of the communications networks managed by them, and that said data are made available to the respective network operator by the network management facility. It is also fulfilled by a network management facility for managing a communications network consisting of two or more network components, comprising an operating facility for communicating with the network operator which is equipped with at least one input device and at least one output device, and a control facility which is designed to manage all network components independently and which is provided with a first communications facility for exchanging management data with the network components, characterized in that the control facility is provided with a second communications facility for exchanging data with another network management facility and that the control facility is designed to receive status information on at least one other communications network by means of the second communications facility and to condition said status information such that the operating facility can make said information accessible to the network operator.

The invention is based on the knowledge that information about the status of foreign communications networks is needed to effectively manage a network for communications relationships that go beyond the range of an autonomous communications network.

The basic concept of the invention consists in that the network management installations exchange status information about the communications networks they manage, and make this information visible to their respective network operators. Each network operator also sees the environment of his communications network and can utilize this information to fulfill his network management tasks.

Advantageous configurations of the invention can be found in the subclaims.

The arrangement according to the invention also has the advantage that communications networks, which consist of an owned and a rented part, are easier to realize. The operator of such a communications network can obtain all the relevant information about the rented part of his network by the 'customer network management' method of the invention.

Another advantage is that a group of network components, which support a very special communications protocol and are used in several autonomous communications networks, can be centrally monitored by a network management installation.

BRIEF DESCRIPTION OF THE DRAWINGS

The invention is explained in greater detail in the following by means of two configuration examples with the help of the attached drawings.

BEST MODE FOR CARRYING OUT THE INVENTION

A first example illustrates the use of the method of the invention in a communications environment with three autonomous communications networks, which are managed by a similar network management installation of the invention.

Figure 1:
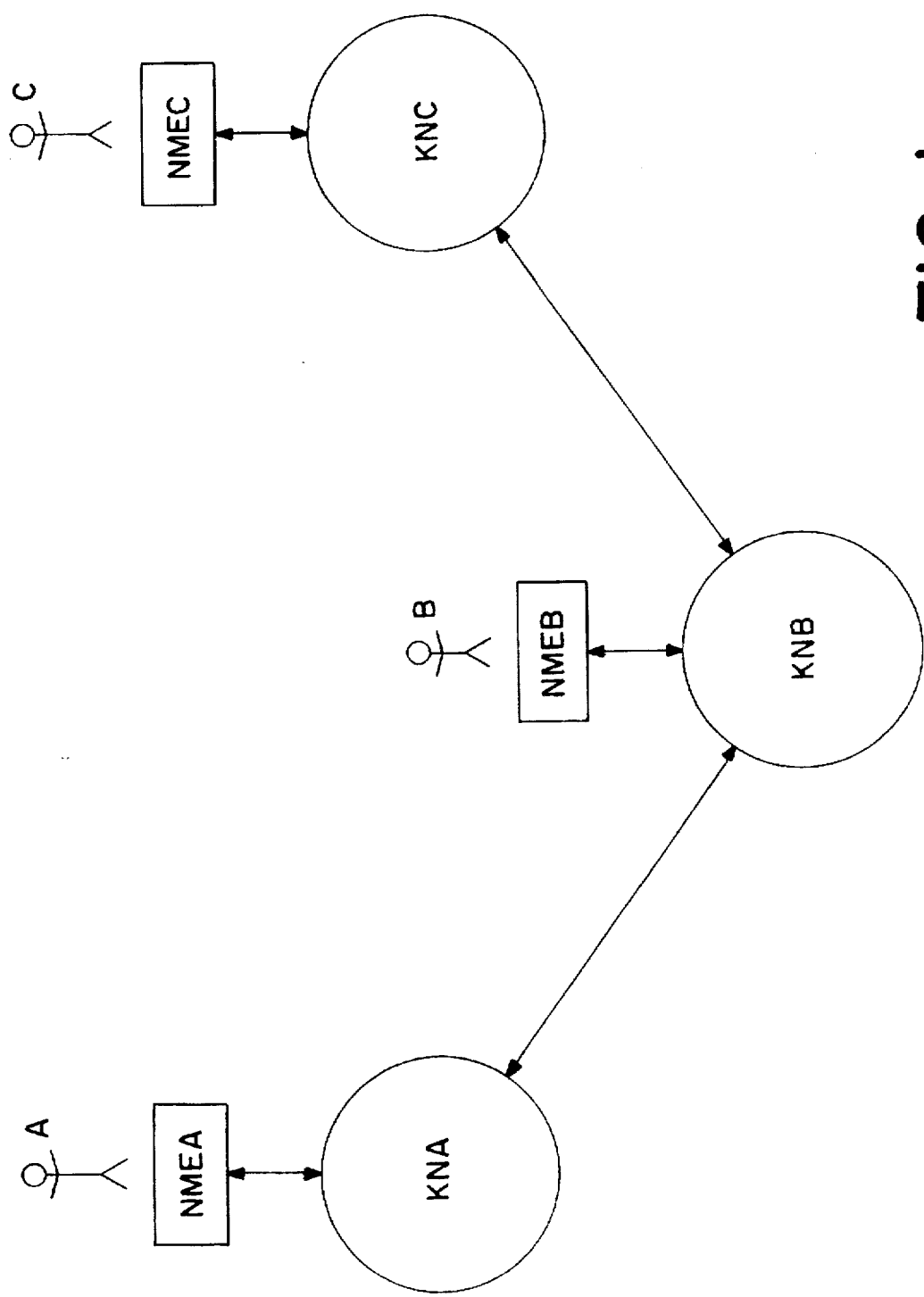
FIG. 1 is a symbolic representation of several communications networks that are connected to each other in accordance with a first configuration example.

FIG. 1 depicts three communications networks KNA, KNB and KNC, three network management installations NMEA, NMEB and NMEC, and three network operators A, B and C.

The communications networks KNA, KNB, KNC are autonomous communications networks. The communications networks KNA and KNC are the company networks of two different enterprises, and the communications network KNB is a public communications network.

The network management installations NMEA, NMEB and NMEC are similar in construction.

A physical data connection exists between the communications networks KNA and KNB, as well as between the communications networks KNB and KNC. In this way, data can be exchanged between the participants of all three communications networks KNA, KNB and KNC.

A, B and C autonomously and by themselves manage the communications networks KNA, KNB or KNC by means of the network management installations NMEA, NMEB or NMEC. Only the respective network operator can actively influence his communications network.

Figure 2:
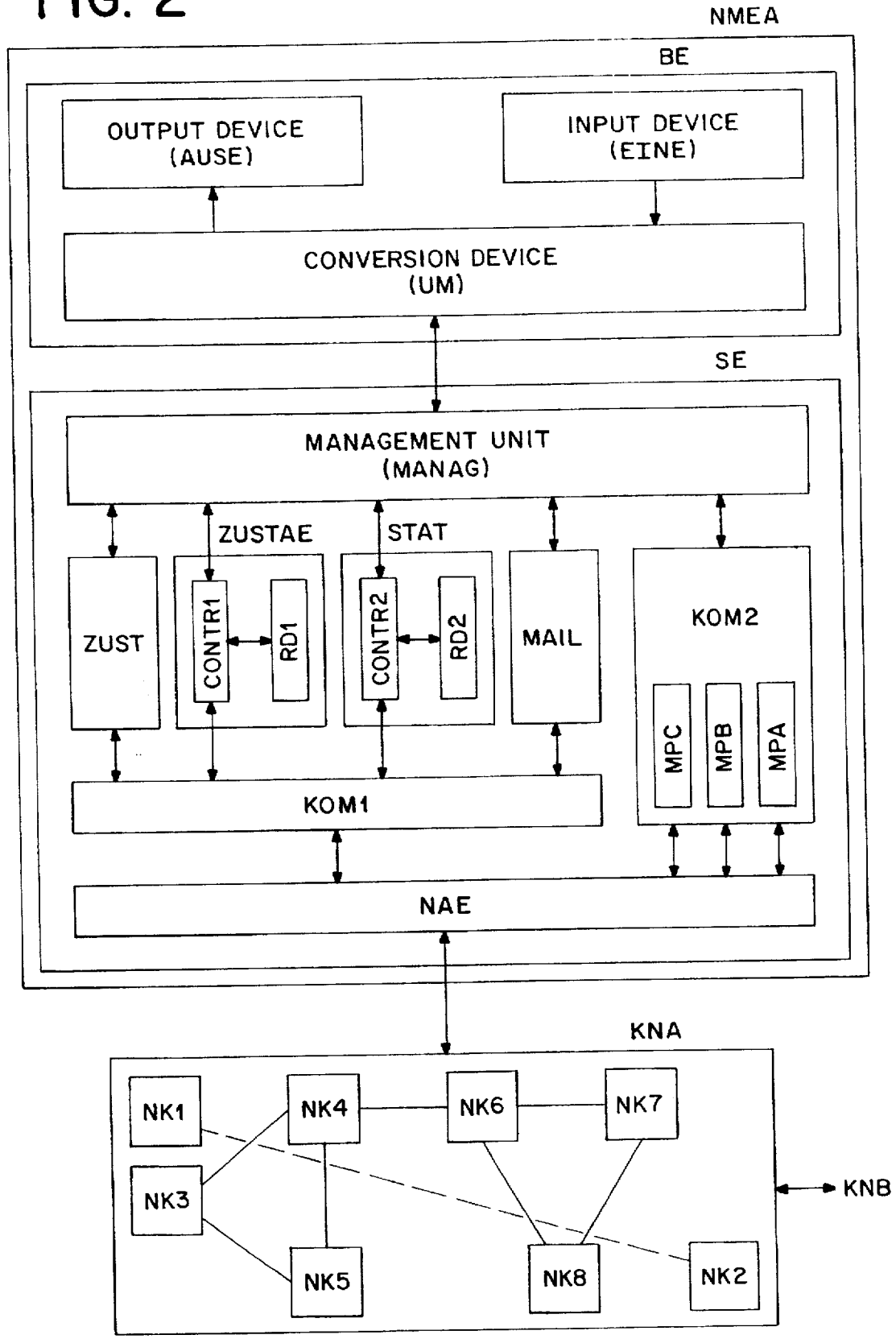
FIG. 2 is a symbolic representation of a network management installation and a communications network according to the first configuration example.

FIG. 2 depicts a network management installation NMEA and a communications network KNA. The communications network KNA is managed by the network management installation NMEA and is connected to the communications network KNB.

The communications network KNA contains network components NK1 to NK8. The network components NK1 and NK2 as well as the network components NK3 to NK8 are connected to each other by communications paths. The network components NK1 and NK2 are telephone network exchanges. The network components NK3 to NK8 are coupling elements (e.g. routers) for a data network. The communications network KNA therefore represents a hybrid communications network. This means that its network components use different communications protocols.

It would also be possible to build the communications network KNA with any other combination of network components. It would particularly be possible for network components belonging to different communications planes to be contained therein. It could also be a non-hybrid communications network. The network management installation NMEA contains an operating installation BE and a control installation SE.

The operating installation BE forms the man-machine interface and contains an output device AUSE, an input device EINE and a conversion device UM.

The conversion device UM communicates with the network operator through the input device EINE and through the output device AUSE, and provides him with a graphical user interface. The latter is used by the network operator to request data from the control installation SE or to input commands.

It is also possible for the operating installation to have several in- and output devices. In this way several persons could simultaneously access the control device SE.

The control device SE contains a management unit MANAG, two communications units KOM1 and KOM2, four protocol processing units ZUST, ZUSTAE, STAT and MAIL, and a network connecting unit NAE.

The management unit MANAG forms the interface with operating installation BE and has access to the network components NK1 to NK8 through the communications unit KOM2 and the network connection unit NAE. It detects every change in the status of a network component (e.g. network component breakdown, connection path interruption) and controls the configuration attributes of network components NK1 to NK8. In this case, configuration attributes are all the changeable conditions of these network components. Thus, configuration attributes are e.g.: "Which in- or outputs are active?"; "Which virtual connections are switched on?"; "Which communications protocols are in use?"

The communications unit KOM2 is responsible for the communications relationships with the network components NK1 to NK8. Communications with the network components NK1 and NK2 are based on a management protocol MPA, to the network components NK3, NK4 and NK5 on a management protocol MPB, and to the network components NK6, NK7 and NK8 on a management protocol MPC. It would also be possible to use a different number or type of management protocols to communicate with network components NK1 to NK8.

The communications unit KOM1 is responsible for the communications relationships with the other network management installations NMEB and NMEC and provides the corresponding data transportation services for the protocol processing units ZUST, ZUSTAE, STAT and MAIL.

The network connection unit NAE controls the physical connection paths through which the communications units KOM1 and KOM2 exchange data with the network management installations NMEA and NMEC, or with network components NK1 to NK8. The data network, through which the data transportation between the network management installations NMEA, NMEB and NMEC takes place, is based on already existing connections between the communications networks KNA, KNB and KNC, which are also used for other purposes.

However, it would also be possible to switch on special communications paths for this data network, forming an autonomous communications network that is independent of the three communications networks KNA, KNB and KNC.

A network management address is assigned to each of the three network management installations NMEA, NMEB and NMEC, whereby the data can be addressed for transportation.

The protocol processing unit ZUST has two functions. On the one hand, it can request status information about network components from the network management installations NMEB and NMEC. Such status information are e.g. the status of a network component, configuration attributes or CAD-drawings of network components. To that effect, it is first requested by the management unit MANAG to request these data from one of the two network management installations NMEB and NMEC, it then requests the data and transmits the data to the management unit MANAG.

On the other hand, when requested, it provides status information about the network components NK1 to NK8 to the network management installations NMEB and NMEC. These data are requested from the management unit MANAG.

The protocol processing unit ZUSTAE transmits status changes in the network components KN1 to KN8 to other network management installations. It contains a control unit CONTR1 and a memory unit where the data file RD1 is stored.

The data file RD1 contains two lists. In both lists, each of the network components NK1 to NK8 can be assigned any desired number of network management addresses. The first list contains the addresses of the network management installations that must be informed of a status change in the network components NK1 to NK8, while the second list contains the addresses of those that must be informed of a change in the configuration attributes.

If the status of one of the network components NK1 to NK8 changes, or if the network operator changes a configuration attribute of one of these network components, control unit CONTR1 checks the respective list in the data file RD1. If found, it informs the corresponding network management installations of the change in status.

The input of the network management addresses into the data file RD1 is performed by an outside network management installation, which instructs control unit CONTR1 to enter its network management address into the first or the second list of data file RD1.

It is also possible to have the network operator A enter the network management addresses into the data file RD1 by means of management unit MANAG and control unit CONTR1.

Another function of control unit CONTR1 consists in entering its own network management address, upon command from management unit MANAG, to a predetermined place in the data file of one of the two network management installations NMEB and NMEC, and to transmit subsequently received data regarding status changes to the management unit MANAG.

It is also possible for the data file RD1 to contain a different number of lists, or for the lists to reflect other status changes.

The protocol processing unit STAT is responsible for the transmission of statistical data. It contains a control unit CONTR2 and a memory unit, in which data file RD2 is stored.

Data file RD2 stores a list in which each network component NK1 to NK8 can be assigned any desired number of network management addresses and corresponding time intervals and types of statistics. The network management installations NMEB or NMEC input into the data file RD2 by means of control unit CONTR2.

When an input is made into the data file RD2, control unit CONTR2 starts a statistical process, which produces a statistic via the stored network component and sends it to the stored network management address after the respective time interval.

The protocol processing unit MAIL provides a service to network operator A whereby he can communicate directly with network operators B and C via 'electronic mail' (e.g. Unix Mail), on the surface (interface) of operating installation BE. Vocal communication is also possible.

The protocol processing units ZUST, ZUSTAE, STAT and MAIL are only illustrated as examples and not all are required. The units could also be replaced by other comparable units.

The example described in FIGS. 1 and 2 clarifies the application of the method according to the invention in an environment with three autonomous communications networks. However, the method could also be applied to a different number of communications networks. The network management installations need not be constructed in the same way.

A realization of a network management installation according to the invention is depicted by a second example.

Figure 3:
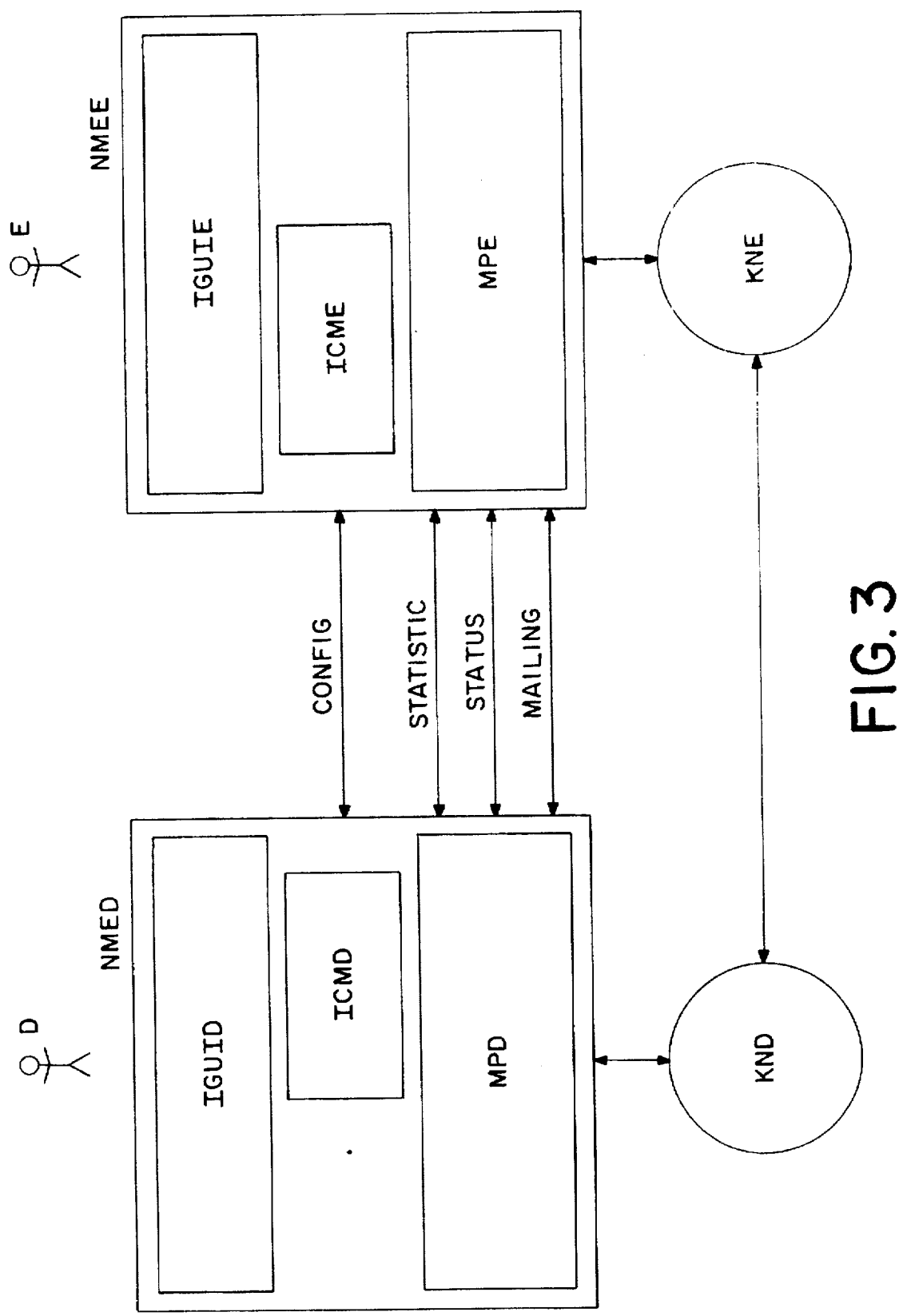
FIG. 3 is a symbolic representation of the communications relationships of two network management installations of the invention according to a second configuration example.

FIG. 3 illustrates two communications networks KND and KNE, two network management installations NMED and NMEE and two network operators D and E.

The communications networks KND and KNE are two autonomous hybrid communications networks, which are connected to each other. The network operators D and E autonomously and independently manage the communications networks KND or KNE by means of network management installations NMED or NMEE.

The two network management installations NMD and NME operate with the programs IGUID, ICMD and MPD or IGUIE, ICME and MPE.

The two network management installations NMED and NMEE are uniform in construction. However, network management installation NMEE could be constructed like the example of FIG. 2.

In the following, the construction of the network management installation NMED will be explained in representative fashion.

The functions of network management installation NMED are processed by a computer that is equipped with respective peripheral components. However, it would also be possible to distribute the functions of network management installation NMED to several computers that are interconnected by a data network.

The program IGUID provides the network operator with a graphical user interface by means of corresponding in- and output devices. For example, this program could be the software tool 'HP Open View Windows' from Hewlett-Packard. Both programs MPD and ICMD are responsible for the actual management of the communications network KND.

The program MPD represents a management platform. It coordinates all management functions of network management installation NMED and provides all the basic services, such as communication with the network components. For example, such a management platform could be the software tool 'HP OVME.3.x' by Hewlett-Packard. ICMD is a program for integrated configuration management, which is based on the services of program MPD.

Additional services are integrated into the program MPD, which make possible an exchange of data with the network management installation NMEE through physical connection paths of communications networks KND and KNE.

Based on these services, additional services are integrated into the program MPD, which control an exchange of statistical data STATISTIC, status data STATUS concerning the status of network components, and communications data MAILING, for electronic mail.

An additional service is integrated into the program ICMD, which controls the exchange of configuration data CONFIG by means of the new services of program MPD.

The programs IGUID, MPD and ICMD operate together, so that network operator D can access data through its own communications network KND, as well as through the outside communications network KNE, on the same graphical interface. In this way a graphic display depicting both communications networks KND and KNE can be achieved. However, an active influence on the individual network components can only be exerted on those network components that are located in their own communications network KND. The programs in FIG. 3 fulfill the same functions as the devices in FIG. 2.

What is claimed is:

1. A network management facility (NMEA, NMEB, NMEC; NMED, NMEE) for managing a communications network (KNA, KNB, KNC; KND, KNE) consisting of two or more network components (NK1 to NK8), comprising an operating facility (BE; IGUID, IGUIE) for communicating with the network operator (A, B, C; D, E) which is equipped with at least one input device (EINE) and at least one output device (AUSE), and a control facility (SE; ICMD+MPD, ICME+MPE) which is designed to manage all network components (NK1 to NK8) independently and which is provided with a first communications facility (KOM2) for exchanging management data with the network components (NK1 to NK8), characterized in that the control facility (SE; ICMD+MPD, ICME+MPE) is provided with a second communications facility (KOM1) for exchanging data with another network management facility (NMEB, NMEC; NMEE, NMED), and that the control facility (SE, ICMD+MPD, ICME+MPE) is designed to receive status information on at least one other communications network (KNB, KNC; KNE, KND) by means of the second communications facility (KOM1) and to condition said status information such that the operating facility (BE; IGUID, IGUIE) can make said information accessible to the network operator (A, B, C; D).

2. A network management facility (NMEA, NMEB, NMEC; NMED, NMEE) as claimed in claim 1, characterized in that it consists of at least two spatially distributed units linked by a data network.

3. A method of managing communications networks (KNA, KNB, KNC; KND, KNE) linked together for data exchange, each communications network (KNA, KNB, KNC; KND, KNE) having respective network components (NK1, NK2, . . . , NK8), such as telephone network exchanges (NK1, NK2) and routers (NK3, NK4, . . . , NK8), and each communications network (KNA, KNB, KNC; KND, KNE) being managed by an associated autonomous network management facility (NMEA, NMEB, NMEC; NMED, NMEE), the method comprising the steps of:

(a) exchanging respective network components status management data containing information about the status of the respective network components in each communications network (KNA, KNB, KNC; KND, KNE) from each associated autonomous network management facility (NMEA, NMEB, NMEC; NMED, NMEE) to other associated autonomous network management facilities (NMEA, NMEB, NMEC; NMED, NMEE); and (b) managing each communications network (KNA, KNB, KNC; KND, KNE) with the associated autonomous network management facility (NMEA, NMEB, NMEC; NMED, NMEE) using the respective network component status management data exchanged from the other associated autonomous network management facilities (NMEA, NMEB, NMEC; NMED, NMEE).

4. A method of supporting the management of a communications network (KNA, KNB, KNC; KND, KNE) in a communications environment in which two or more communications networks (KNA, KNB, KNC; KND, KNE) are linked in such a way that an exchange of data is possible between them, and in which each communications network (KNA, KNB, KNC; KND, KNE) is managed by means of an associated, autonomous network management facility (NMEA, NMEB, NMEC; NMED, NMEE), characterized in that each of the associated, autonomous network management facilities (NMEA, NMEB, NMEC; NMED, NMEE) sends through a data network, respective communications network status data on the status of respective communications networks (KNA, KNB, KNC; KND, KNE) exclusively managed by them to other network management facilities (NMEA, NMEB, NMEC: NMED, NMEE), and that the respective communications network status data are made available to the respective network operator (A, B, C; D, E) by the associated) autonomous network management facilities (NMEA, NMEB, NMEC; NMED, NMEE) to manage the respective communications networks (KNA, KNB, KNC; KND, KNE).

5. A method as claimed in claim 4, characterized in that the data network uses physical connections of the communications networks (KNE, KNB, KNC; KND, KNE).

6. A method as claimed in claim 4, characterized in that in each network management facility (NMEA, NMEB, NMEC), data identifying a number of other management network facilities (NMEB, NMEC) is contained in a file (RD1) for each network component (NK1 to NK8), that any change in the status of a network component (NK1 to NK8) is detected, and that upon detection of a change in the status of a network component (NK1 to NK8), the network management facilities associated with said network component in the file (RD1) are notified of said change.

7. A method as claimed in claim 6, characterized in that the data in the file (RD1) are generated and modified by means of an input device (EINE).

8. A method as claimed in claim 6, characterized in that entries into the file (RD1) are initiated by any one of the other network management facilities (NMEB, NMEC) through the data network.

9. A method as claimed in claim 4, characterized in that the communications network status data on the status of a communications network are statistical data (STATISTIC).

10. A method as claimed in claim 4, characterized in that the received data on the status of other communications networks (STATISTIC, CONFIG, STATUS) are conditioned by a network management facility (NMED, NMEE) in such a way as to be retrievable by the respective network operator in a graphic representation via the same user interface via which the network operator's own communications network (KND, KNE) is managed.

11. A method as claimed in claim 4, characterized in that the method includes the step of providing the respective communications network status data with the status of a network component like either a network component breakdown or a connection path interruption or with control configuration attributes of network components.

* * * * *

UNITED STATES PATENT AND TRADEMARK OFFICE
CERTIFICATE OF CORRECTION

PATENT NO. : 5,715,394
DATED : February 3, 1998
INVENTOR(S) : Arno Jabs

It is certified that error appears in the above-identified patent and that said Letters Patent is hereby corrected as shown below:

Title page, item [30],

Please delete "43 21 458.8" and insert --43 21 458.4--.

At column 8, claim 4, line 25, please delete "associated)autonomous" and insert --associated,autonomous--.

Signed and Sealed this

Sixteenth Day of February, 1999

Attest:

Attesting Officer

*Acting Commissioner of Patents and Trademarks*